United States Patent Office.

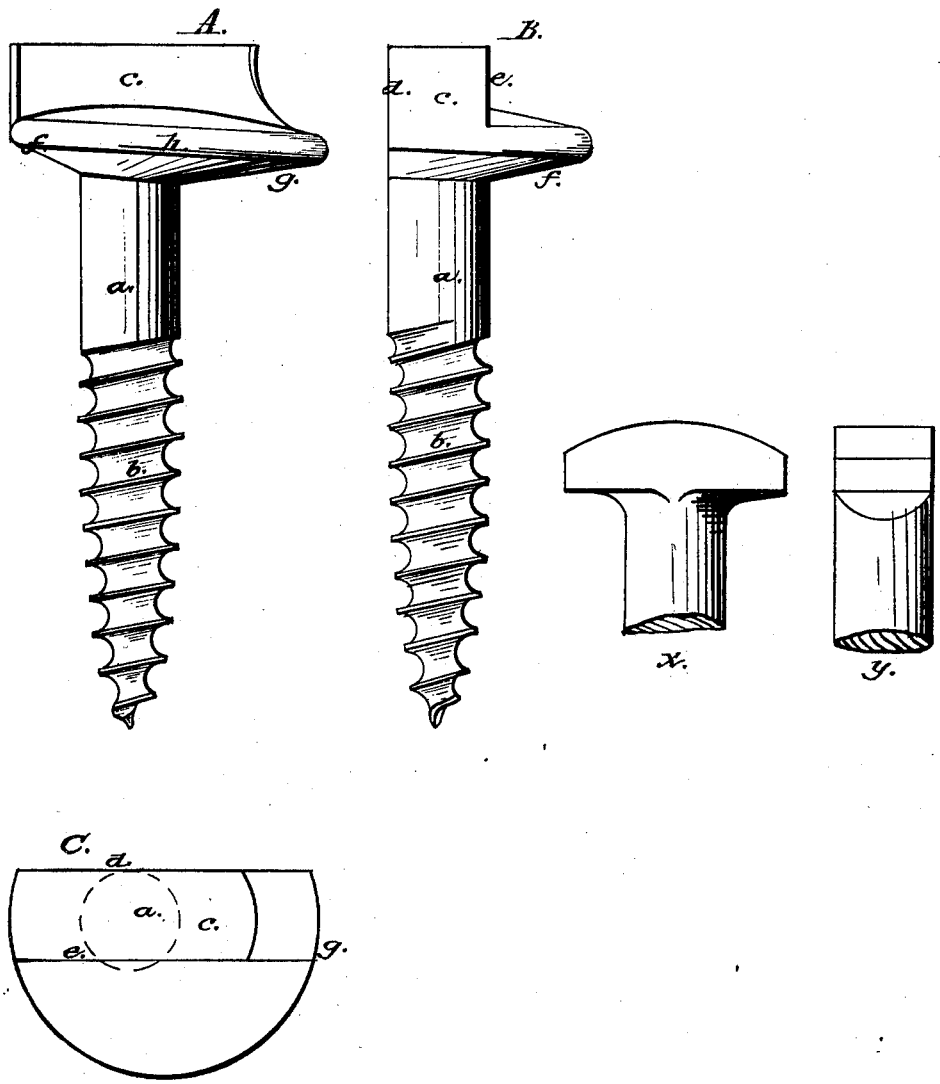
C. L. Heywood,
Railway Spike.
No. 94,601.
Patented Sep. 7, 1869.

C. L. HEYWOOD, OF BOSTON, MASSACHUSETTS.

Letters Patent No. 94,601, dated September 7, 1869.

IMPROVED RAILWAY-SPIKE.

The Schedule referred to in these Letters Patent and making part of the same.

*To all whom it may concern:*

Be it known that I, C. L. HEYWOOD, of Boston, in the county of Suffolk, and State of Massachusetts, have invented an Improved Railway-Screw or Spike; and I do hereby declare that the following, taken in connection with the drawings which accompany and form part of this specification, is a description of my invention sufficient to enable those skilled in the art to practise it.

The invention relates, particularly, to the construction of that class of screw-spikes having heads formed upon them for turning the screws into and out of railway-sleepers, or other beams or timbers.

Such a screw or spike, as heretofore made, has had a head formed upon it, as shown at $x$ and $y$ in the drawings, which respectively represent side and edge views of the head and the top of the shank of a screw-spike for securing railway-rails to sleepers. The head has a width corresponding to the diameter of the screw-shank, and a length in excess of such diameter, such as to make a lip on each side of the shank, one of these lips projecting over the flange of the rail, and holding the rail in position, while by turning the spike, so that the head is parallel with the flange, the rail can be applied or removed.

The objection to such construction is this: When the rail is to be fastened down, the spike is screwed into the sleeper, with a suitable wrench. When one lip on the head comes down near to the rail, if it does not touch the rail-flange, or bear down sufficiently hard thereupon, the spike must be turned a half revolution to bring the opposite lip over the flange, the screw-thread of course penetrating deeper into the sleeper by this semi-rotation. But when the opposite lip is thus brought to the rail, it will probably have sunk too deep to permit it to slip over the rail-flange, and as the rail-metal will not yield or break away, as with wood, the spike has to be turned back, bringing the other lip over the rail-flange, at such a distance from the top surface thereof as fails to bring the lip down tightly enough upon the rail to hold it securely.

Now, the prime object of my invention is to remedy this defect, and I accomplish this by making the wrench-applying head with a lip extending all around the shank, except on one side, (which side is left flush with the side of the shank,) and my invention consists in making a wood screw, (having a wrench-applying head,) with a surface on one side of the head, flush with the side of the screw-shank, and a continuous lip or flange extending from one end of such flush face, around the shank, to the opposite end thereof, or so as to have a flush face on one side of the head, and a continuous lip on the other three sides thereof, and in forming this lip with a downward inclination upon its under surface, and with a gradually-increasing width of bearing-surface from one to the opposite end thereof.

The drawing represents, at A, B, and C, a screw, embodying my invention, A and B showing the screw in elevation, and C, a plan of the same.

$a$ denotes the shank.
$b$, the screw-thread.
$c$, the head.

The head is formed with two parallel sides, $d$ $e$, and, preferably, of a width about equal to the diameter of the shank $a$, and of a length exceeding the same, in order to obtain a firm hold upon the screw with a screw-wrench, and one side, $d$, is flush, or nearly flush, with one side of the bolt, to enable the spike to be entered into the sleeper, close to the flange of the rail, to be secured thereto, and to permit the rail to be removed or placed upon the sleepers without withdrawing the spike, by simply turning the screw, so as to bring the flush side $d$ inward, or parallel to the rail.

The projection of the head, at the two ends thereof, forms a bearing-lip or shoulder, $f$ or $g$, under each end of the head; and to unite these lips, or to form a continuous lip or bearing-surface from one end of the head to the opposite end thereof, I extend a flange or lip, $h$, laterally from the head, or in continuation with and joining the lips $f$ $g$, thereby not only securing in the screw the provision for applying and removing it with a wrench, and the provision for slipping the rail into and from position, but also making a bearing-surface, without a break, from end to end of the head, so that when the spike is screwed down to the sleeper, and the lip $f$ fails to bear upon its flange, there shall be left the whole length of lip $f$ $h$ $g$, any part of which may come down upon the rail and hold it.

To insure the bite of some part of the lip upon the rail-flange, I incline the under surface of the lip, as seen at A, so that if, when turning the spike, the lip $g$ just escapes by the rail-flange, the lip $f$ is so much higher, that it cannot fail to slip over the flange when it is next brought against it, while in the regular progress of the screw-thread during the following turn of the lip $f$ $g$ $h$ over the flange, the lip must bite upon and secure it to the sleeper.

I also increase the length of the bearing-surface of the lip, as seen in the drawings, so that when the lip begins to bear upon the rail-flange, the further rotation of the screw brings an increasing holding-surface upon the rail-flange, and thus more securely holds the rail to the sleeper.

I will be obvious, that a screw-spike thus made may be used for other purposes, though I design it particularly for use as a railway-spike.

I claim—

A screw-spike, having a lip or flange cut away on one side, and having an inclined under or bearing-surface, when such lip or flange gradually increases in width, substantially as shown and described.

Also, a screw-spike, having all the features specified in the preceding claim, and having, also, a wrench-applying head, substantially as shown and described.

C. L. HEYWOOD.

Witnesses:
FRANCIS GOULD,
L. H. LATIMER.